J. WERNER.
COMPOSITION FOR LINING ALE AND BEER CASKS.
No. 99,124. Patented Jan. 25, 1870.
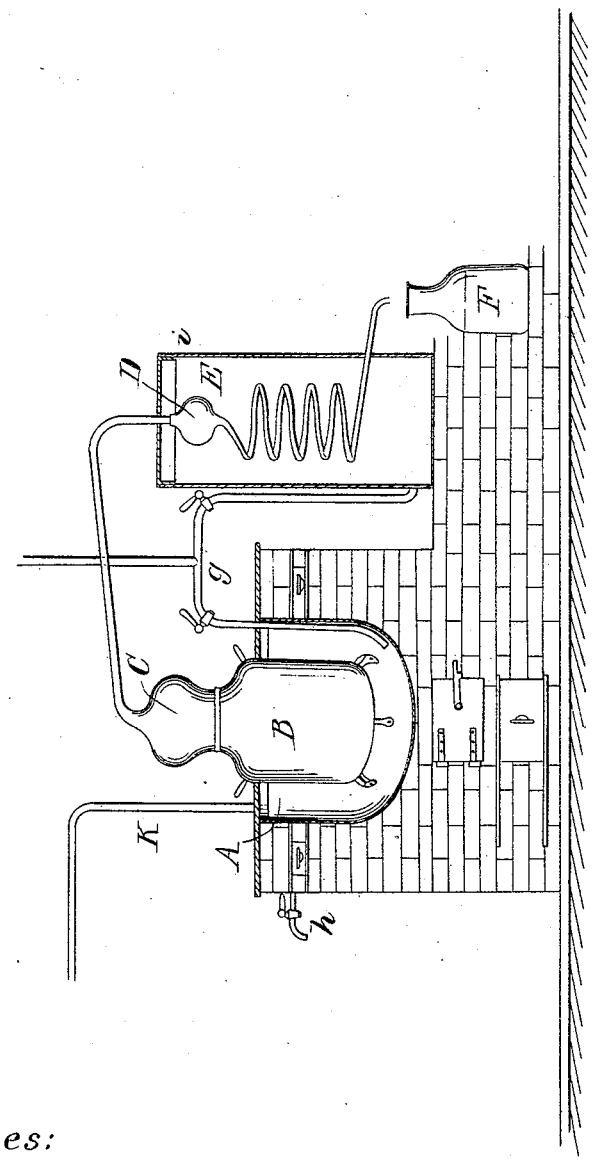
Witnesses:
Inventor:

United States Patent Office.

JOHN WERNER, OF MANNHEIM, BADEN.

Letters Patent No. 99,124, dated January 25, 1870.

IMPROVED COMPOSITION FOR LINING ALE AND BEER-CASKS.

The Schedule referred to in these Letters Patent and making part of the same.

Analysis, specification, and drawing of Apparatus to the "Glaze or Enamel," as a substitute for "brewers' pitch," invented by JOHN WERNER.

First, scrape, wash, and pulverize two and a half pounds of best (African) kowrie-copal, and dry it out well on a hurdle made of copper or galvanized sheet-iron. When perfectly dry, put the powder into a wooden tub provided with a tight-closing lid, and successively mix with it one and a half pound of concentrated sulphuric ether, constantly stirring it up until it has become a proportionable paste. Then shut down the lid, and let the ether operate on the gum for forty-eight hours, when it is thinned down with ten pounds of highly-rectified alcohol, (ninety-five to ninety-six per cent. Tralles.)

Second, put fifty-two pounds of alcohol (ninety to ninety-two per cent.) into a stilling-apparatus constructed as in drawing attached. Add to it ten and a half pounds of pulverized (garnet or cerise) gum-shellac, sixteen ounces of Venetian turpentine, four ounces of natural beeswax, and two ounces of sperm, together with mixture No. 1, and distil the so-obtained composition as follows:

The first pound and a half, stilling over, being ether chiefly, is collected separately, and may be used again for the following seething.

After that, twenty-five pounds of alcohol are slowly and handsomely distilled over, that is to say, in about two hours' time, which, of course, also can be used for future manufacturing.

The remainder in the apparatus must be strained, while hot, through a cullender made of fine brass-wire weaving, into a tin or copper cooler, and forms, when cold, the enamel or glaze ready for use.

This glaze has proved to be, according to hundreds of testimonies of practical brewers, not only a substitute in the place of the pitch hitherto used in breweries for the purpose of isolating pipes, casks, barrels, &c., but is far superior to it, because—

First, the employing of the glaze is not at all dangerous, whereas the origin of fires from seven out of ten burned-down breweries can be traced back to the very dangerous manipulation of "pitching."

Second, the glaze never cracks, nor comes off, no matter how roughly a so-prepared cask may be handled or thrown about, while pitch always cracks and comes off in pieces.

Third, the glaze preserves the wood, because it is applied as a cold liquid, while, on the other hand, pitch, by the only one possible mode of its employment, i. e., burning with flames, extracts and absorbs the vital and natural strength of the wood, and renders it brittle and mellow. A cask annually prepared with pitch, in five years is good for nothing, and must be cast away, while a cask prepared with glaze will last a lifetime.

Fourth, and chiefly, the glaze never has any influence or effect upon the natural taste or smack of ale, porter, or beer, being perfectly neutral, whereas pitch ever communicates to these beverages a more or less sappy, disagreeable tang, and can, for such reason, never be used in pale-ale breweries.

Having fully described the nature and use of my compound, together with the manner of preparing it,

What I claim as my invention, and desire to secure by Letters Patent, is—

The compound herein described, prepared in the manner set forth, as and for the purpose specified.

In testimony of which invention, I hereunto set my hand and seal, this 22d day of October, 1869.

JOHN WERNER. [L. S.]

Witnesses:
FRANCIS WINTEROLL,
HERMANN KAESSN.